United States Patent
Wang et al.

(10) Patent No.: US 8,169,657 B2
(45) Date of Patent: May 1, 2012

(54) REGISTRATION METHOD USING SENSED IMAGE MARKS AND DIGITAL REALIGNMENT

(75) Inventors: Shen-Ge Wang, Fairport, NY (US); Robert P. Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 971 days.

(21) Appl. No.: 11/801,231

(22) Filed: May 9, 2007

(65) Prior Publication Data
US 2008/0278735 A1 Nov. 13, 2008

(51) Int. Cl.
*G06K 15/10* (2006.01)
*B41J 2/385* (2006.01)

(52) U.S. Cl. ............ 358/1.5; 358/1.4; 358/2.1; 358/1.9; 358/1.18; 358/3.26; 358/3.28; 358/3.32; 358/501; 358/504; 358/505; 358/515; 358/517; 358/518; 358/533; 358/538; 358/406; 358/488; 347/24; 347/115; 347/116; 347/117; 347/118; 347/172; 347/175; 347/177; 347/178; 347/232; 347/233; 382/162; 382/164; 382/165; 382/166; 382/167; 382/275; 382/289; 382/296; 399/16; 399/49; 399/72; 399/298; 399/300; 399/301; 399/394; 399/395; 400/61; 400/74; 400/76; 400/103; 400/104; 400/630

(58) Field of Classification Search .................. 358/1.18, 358/504, 1.5, 1.4, 2.1, 1.9, 3.26, 3.32, 505; 355/22; 271/245, 270, 294, 3.02, 13, 15, 271/10.12, 226, 227, 228, 229, 232

See application file for complete search history.

(56) References Cited

U.S. PATENT DOCUMENTS

| | | | |
|---|---|---|---|
| 4,579,446 A | 4/1986 | Fujino et al. | |
| 4,587,532 A | 5/1986 | Asano | |
| 4,804,979 A * | 2/1989 | Kamas et al. | 347/116 |
| 4,836,119 A | 6/1989 | Siraco et al. | |
| 5,004,222 A | 4/1991 | Dobashi | |
| 5,008,713 A | 4/1991 | Ozawa et al. | |
| 5,031,032 A | 7/1991 | Perregaux et al. | |
| 5,080,340 A | 1/1992 | Hacknauer et al. | |
| 5,095,342 A | 3/1992 | Farrell et al. | |
| 5,159,395 A | 10/1992 | Farrell et al. | |
| 5,208,640 A | 5/1993 | Horie et al. | |
| 5,264,943 A | 11/1993 | Curry | |
| 5,272,511 A | 12/1993 | Conrad et al. | |

(Continued)

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

*Primary Examiner* — Steven Kau
(74) *Attorney, Agent, or Firm* — Fay Sharpe LLP

(57) ABSTRACT

A method of registering a print between print stages in a printing system is provided. The method comprises: printing a first part of a digital image on a substrate with a first print engine, wherein the first part of the digital image includes a plurality of reference features; scanning image content on the substrate as it is readied for the second print engine; determining the actual positions of the reference features; using the actual positions of the reference features to determine desired adjustments for the second part of the digital image; applying electronic registration according to the desired adjustments to modify image content of the second print to be aligned with content already on the substrate; and printing a second part of the digital image on the substrate.

16 Claims, 3 Drawing Sheets

U.S. PATENT DOCUMENTS

| | | | |
|---|---|---|---|
| 5,326,093 | A | 7/1994 | Sollitt |
| 5,384,592 | A * | 1/1995 | Wong ............................ 347/116 |
| 5,430,472 | A | 7/1995 | Curry |
| 5,435,544 | A | 7/1995 | Mandel |
| 5,473,419 | A | 12/1995 | Russel et al. |
| 5,473,513 | A | 12/1995 | Quinn |
| 5,489,969 | A | 2/1996 | Soler et al. |
| 5,504,568 | A | 4/1996 | Saraswat et al. |
| 5,515,451 | A | 5/1996 | Tsuji et al. |
| 5,525,031 | A | 6/1996 | Fox |
| 5,545,913 | A | 8/1996 | Quinn et al. |
| 5,552,828 | A | 9/1996 | Perregaux |
| 5,557,367 | A | 9/1996 | Yang et al. |
| 5,568,246 | A | 10/1996 | Keller et al. |
| 5,570,172 | A | 10/1996 | Acquaviva |
| 5,596,416 | A | 1/1997 | Barry et al. |
| 5,604,362 | A | 2/1997 | Jedlicka et al. |
| 5,629,762 | A | 5/1997 | Mahoney et al. |
| 5,691,760 | A | 11/1997 | Hosier et al. |
| 5,710,968 | A | 1/1998 | Clark et al. |
| 5,748,344 | A | 5/1998 | Rees |
| 5,778,377 | A | 7/1998 | Marlin et al. |
| 5,857,784 | A * | 1/1999 | Allen .............................. 400/74 |
| 5,884,910 | A | 3/1999 | Mandel |
| 5,995,721 | A | 11/1999 | Rourke et al. |
| 6,059,284 | A | 5/2000 | Wolf et al. |
| 6,125,248 | A | 9/2000 | Moser |
| 6,241,242 | B1 | 6/2001 | Munro |
| 6,268,899 | B1 * | 7/2001 | Edwards et al. ................. 355/22 |
| 6,297,886 | B1 | 10/2001 | Cornell |
| 6,341,773 | B1 | 1/2002 | Aprato et al. |
| 6,384,918 | B1 | 5/2002 | Hubble, III et al. |
| 6,450,711 | B1 | 9/2002 | Conrow |
| 6,476,376 | B1 | 11/2002 | Biegelsen et al. |
| 6,476,923 | B1 | 11/2002 | Cornell |
| 6,493,098 | B1 | 12/2002 | Cornell |
| 6,529,643 | B1 | 3/2003 | Loce et al. |
| 6,537,910 | B1 | 3/2003 | Burke et al. |
| 6,550,762 | B2 | 4/2003 | Stoll |
| 6,554,276 | B2 | 4/2003 | Jackson et al. |
| 6,577,925 | B1 | 6/2003 | Fromherz |
| 6,607,320 | B2 | 8/2003 | Bobrow et al. |
| 6,608,988 | B2 | 8/2003 | Conrow |
| 6,612,566 | B2 | 9/2003 | Stoll |
| 6,612,571 | B2 | 9/2003 | Rider |
| 6,621,576 | B2 | 9/2003 | Tandon et al. |
| 6,633,382 | B2 | 10/2003 | Hubble, III et al. |
| 6,639,669 | B2 | 10/2003 | Hubble, III et al. |
| 6,654,136 | B2 | 11/2003 | Shimada |
| 6,686,922 | B2 | 2/2004 | Loce et al. |
| 6,816,269 | B1 | 11/2004 | Loce et al. |
| 6,819,906 | B1 | 11/2004 | Herrmann et al. |
| 6,925,283 | B1 | 8/2005 | Mandel et al. |
| 6,958,828 | B2 | 10/2005 | Knox et al. |
| 6,959,165 | B2 | 10/2005 | Mandel et al. |
| 6,973,286 | B2 | 12/2005 | Mandel et al. |
| 7,024,152 | B2 | 4/2006 | Lofthus et al. |
| 7,119,928 | B2 | 10/2006 | Harrington |
| 7,123,873 | B2 | 10/2006 | deJong et al. |
| 7,162,172 | B2 | 1/2007 | Grace et al. |
| 7,188,929 | B2 | 3/2007 | Lofthus et al. |
| 7,206,532 | B2 | 4/2007 | Lofthus et al. |
| 7,206,536 | B2 | 4/2007 | Julien |
| 7,224,913 | B2 | 5/2007 | Richards |
| 7,226,049 | B2 | 6/2007 | Lofthus et al. |
| 7,226,158 | B2 | 6/2007 | Moore et al. |
| 7,680,449 | B2 * | 3/2010 | Shimizu ........................ 399/400 |
| 7,697,151 | B2 * | 4/2010 | Mongeon ..................... 358/1.14 |
| 2002/0078012 | A1 | 6/2002 | Ryan et al. |
| 2002/0103559 | A1 | 8/2002 | Gartstein |
| 2003/0077095 | A1 | 4/2003 | Conrow |
| 2003/0175602 | A1 | 9/2003 | Kazama |
| 2004/0085561 | A1 | 5/2004 | Fromherz |
| 2004/0085562 | A1 | 5/2004 | Fromherz |
| 2004/0088207 | A1 | 5/2004 | Fromherz |
| 2004/0150156 | A1 | 8/2004 | Fromherz et al. |
| 2004/0150158 | A1 | 8/2004 | Biegelsen et al. |
| 2004/0153983 | A1 | 8/2004 | McMillan |
| 2004/0216002 | A1 | 10/2004 | Fromherz et al. |
| 2004/0225391 | A1 | 11/2004 | Fromherz et al. |
| 2004/0225394 | A1 | 11/2004 | Fromherz et al. |
| 2004/0247365 | A1 | 12/2004 | Lofthus et al. |
| 2005/0286083 | A1 | 12/2005 | Wang et al. |
| 2006/0034631 | A1 | 2/2006 | Lofthus et al. |
| 2006/0066885 | A1 | 3/2006 | Anderson et al. |
| 2006/0067756 | A1 | 3/2006 | Anderson et al. |
| 2006/0067757 | A1 | 3/2006 | Anderson et al. |
| 2006/0092264 | A1 | 5/2006 | Matsuzaki et al. |
| 2006/0114313 | A1 | 6/2006 | Moore |
| 2006/0114497 | A1 | 6/2006 | Anderson et al. |
| 2006/0115287 | A1 | 6/2006 | Roof |
| 2006/0115288 | A1 | 6/2006 | Roof |
| 2006/0120787 | A1 * | 6/2006 | Abello ............................ 400/76 |
| 2006/0132815 | A1 | 6/2006 | Lofthus et al. |
| 2006/0197966 | A1 | 9/2006 | Viturro et al. |
| 2006/0209101 | A1 | 9/2006 | Mizes |
| 2006/0214359 | A1 | 9/2006 | Clark |
| 2006/0214364 | A1 | 9/2006 | Clark et al. |
| 2006/0215240 | A1 * | 9/2006 | Mongeon ....................... 358/504 |
| 2006/0221159 | A1 | 10/2006 | Moore et al. |
| 2006/0221362 | A1 | 10/2006 | Julien et al. |
| 2006/0222378 | A1 | 10/2006 | Julien |
| 2006/0222384 | A1 | 10/2006 | Moore et al. |
| 2006/0222393 | A1 | 10/2006 | de Jong et al. |
| 2006/0227350 | A1 | 10/2006 | Crawford et al. |
| 2006/0230201 | A1 | 10/2006 | Fromherz et al. |
| 2006/0230403 | A1 | 10/2006 | Crawford et al. |
| 2006/0233569 | A1 | 10/2006 | Furst et al. |
| 2006/0235547 | A1 | 10/2006 | Hindi et al. |
| 2006/0238778 | A1 | 10/2006 | Mongeon et al. |
| 2006/0244980 | A1 | 11/2006 | Grace |
| 2006/0268317 | A1 | 11/2006 | Lofthus et al. |
| 2006/0268318 | A1 | 11/2006 | Lofthus et al. |
| 2006/0269310 | A1 | 11/2006 | German et al. |
| 2006/0274334 | A1 | 12/2006 | Mongeon |
| 2006/0274337 | A1 | 12/2006 | Dalal et al. |
| 2006/0280517 | A1 | 12/2006 | Roof et al. |
| 2006/0285159 | A1 | 12/2006 | Frankel |
| 2006/0285161 | A1 * | 12/2006 | Otsuka ......................... 358/1.18 |
| 2006/0285857 | A1 | 12/2006 | Swift |
| 2007/0002085 | A1 | 1/2007 | Sampath et al. |
| 2007/0002344 | A1 | 1/2007 | Klassen |
| 2007/0002403 | A1 | 1/2007 | Klassen |
| 2007/0024894 | A1 | 2/2007 | Moore et al. |
| 2007/0031170 | A1 | 2/2007 | deJong et al. |
| 2007/0041745 | A1 | 2/2007 | Dalal et al. |
| 2007/0052991 | A1 | 3/2007 | Goodman et al. |
| 2007/0071465 | A1 | 3/2007 | Hamby et al. |
| 2007/0081064 | A1 | 4/2007 | Spencer et al. |
| 2007/0081828 | A1 | 4/2007 | Radulski et al. |
| 2007/0110301 | A1 | 5/2007 | Wu et al. |
| 2007/0116479 | A1 | 5/2007 | Mandel et al. |
| 2007/0147920 | A1 * | 6/2007 | Shimizu ........................ 399/400 |

OTHER PUBLICATIONS

Desmond Fretz, "Cluster Printing Solution Announced", Today at Xerox (TAX), No. 1129, Aug. 3, 2001.
Wolberg, George, Digital Image Warping, pp. 1-10, IEEE Computer Society Press, Los Angeles, CA.
U.S. Appl. No. 10/881,619, filed Jun. 30, 2004, Bobrow.
U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,450, filed Nov. 30, 2004, Lofthus et al.
U.S. Appl. No. 11/000,168, filed Nov. 30, 2004, Biegelsen et al.
U.S. Appl. No. 11/109,566, filed Apr. 19, 2005, Mandel et al.
U.S. Appl. No. 11/166,299, filed Jun. 24, 2005, Moore.
U.S. Appl. No. 11/166,460, filed Jun. 24, 2005, Roof et al.
U.S. Appl. No. 11/166,581, filed Jun. 24, 2005, Lang et al.
U.S. Appl. No. 11/215,791, filed Aug. 30, 2005, Hamby et al.
U.S. Appl. No. 11/234,468, filed Sep. 23, 2005, Hamby et al.
U.S. Appl. No. 11/234,553, filed Sep. 23, 2005, Mongeon.
U.S. Appl. No. 11/291,583, filed Nov. 30, 2005, Lang.
U.S. Appl. No. 11/291,860, filed Nov. 30, 2005, Willis.

U.S. Appl. No. 11/287,685, filed Nov. 28, 2005, Carolan.
U.S. Appl. No. 11/317,589, filed Dec. 23, 2005, Biegelsen et al.
U.S. Appl. No. 11/314,774, filed Dec. 21, 2005, Klassen.
U.S. Appl. No. 11/317,167, filed Dec. 23, 2005, Lofthus et al.
U.S. Appl. No. 11/314,828, filed Dec. 21, 2005 Anderson et al.
U.S. Appl. No. 11/292,388, filed Nov. 30, 2005 Mueller.
U.S. Appl. No. 11/292,163, filed Nov. 30, 2005, Mandel et al.
U.S. Appl. No. 11/312,081, filed Dec. 20, 2005, Mandel et al.
U.S. Appl. No. 11/331,627, filed Jan. 13, 2006, Moore.
U.S. Appl. No. 11/341,733, filed Jan. 27, 2006, German.
U.S. Appl. No. 11/359,065, filed Feb. 22, 2005, Banton.
U.S. Appl. No. 11/349,828, filed Feb. 8, 2006, Banton.
U.S. Appl. No. 11/364,685, filed Feb. 28, 2006, Hindi et al.
U.S. Appl. No. 11/363,378, filed Feb. 27, 2006, Anderson et al.
U.S. Appl. No. 11/378,046, filed Mar. 17, 2006, Rizzolo et al.
U.S. Appl. No. 11/378,040, filed Mar. 17, 2006, German.
U.S. Appl. No. 11/403,785, filed Apr. 13, 2006, Banton et al.
U.S. Appl. No. 11/399,100, filed Apr. 6, 2006, Paul.
U.S. Appl. No. 11/417,411, filed May 4, 2006, DeGruchy.
U.S. Appl. No. 11/432,924, filed May 12, 2006, Lieberman et al.
U.S. Appl. No. 11/432,905, filed May 12, 2006 Mongeon et al.
U.S. Appl. No. 11/432,993, filed May 12, 2006 Anderson.
U.S. Appl. No. 11/487,206, filed Jul. 14, 2006, Wu et al.
U.S. Appl. No. 11/485,870, filed Jul. 13, 2006, Moore.
U.S. Appl. No. 11/474,247, filed Jun. 23, 2006, Moore.
U.S. Appl. No. 11/483,747, filed Jul. 6, 2006, Meetze.
U.S. Appl. No. 11/495,017, filed Jul. 28, 2006, Bean.
U.S. Appl. No. 11/501,654, filed Aug. 9, 2006, Mestha et al.
U.S. Appl. No. 11/522,171, filed Sep. 15, 2006, Sampath et al.
U.S. Appl. No. 11/528,770, filed Sep. 27, 2006, Degruchy.
U.S. Appl. No. 11/595,630, filed Nov. 9, 2006, Moore.
U.S. Appl. No. 11/590,432, filed Oct. 31, 2006, Moore.
U.S. Appl. No. 11/636,747, filed Dec. 11, 2006, Mestha et al.
U.S. Appl. No. 11/636,901, filed Dec. 11, 2006, Banton et al.
U.S. Appl. No. 11/639,073, filed Dec. 14, 2006, Biegelsen et al.
U.S. Appl. No. 11/643,119, filed Dec. 21, 2006, Clark et al.
U.S. Appl. No. 11/656,992, filed Jan. 23, 2007, Sampath et al.
U.S. Appl. No. 11/708,298, filed Feb. 20, 2007, Lang.
U.S. Appl. No. 11/714,016, filed Mar. 5, 2007, Furst.
U.S. Appl. No. 11/787,777, filed Apr. 18, 2007, Costanza et al.

* cited by examiner

REGISTRATION METHOD USING SENSED IMAGE MARKS AND DIGITAL REALIGNMENT

CROSS REFERENCE TO RELATED PATENTS AND APPLICATIONS

The following patents/applications, the disclosures of each being totally incorporated herein by reference, are mentioned:

U.S. Publication No. US-2006-0034631-A1, published Feb. 16, 2006, entitled "MULTIPLE OBJECT SOURCES CONTROLLED AND/OR SELECTED BASED ON A COMMON SENSOR," by Robert M. Lofthus, et al.;

U.S. Pat. No. 6,959,165, issued Oct. 25, 2005, entitled "HIGH RATE PRINT MERGING AND FINISHING SYSTEM FOR PARALLEL PRINTING," by Barry P. Mandel, et al.;

U.S. Pat. No. 7,162,172, issued Jan. 9, 2007, entitled "SEMI-AUTOMATIC IMAGE QUALITY ADJUSTMENT FOR MULTIPLE PRINT ENGINE SYSTEMS," by Robert E. Grace, et al.;

U.S. Publication No. US-2006-0197966-A1, published Sep. 7, 2006, entitled "GRAY BALANCE FOR A PRINTING SYSTEM OF MULTIPLE PRINT ENGINES," by R. Enrique Viturro, et al.;

U.S. Publication No. US-2006-0114313-A1, published Jun. 1, 2006, entitled "PRINTING SYSTEM," by Steven R. Moore;

U.S. Publication No. US-2006-0209101-A1, published Sep. 21, 2006, entitled "SYSTEMS AND METHODS FOR MEASURING UNIFORMITY IN IMAGES," by Howard Mizes;

U.S. Publication No. 20031468-US-NP, published Sep. 28, 2006, entitled IMAGE QUALITY CONTROL METHOD AND APPARATUS FOR MULTIPLE PRINT ENGINE SYSTEMS," by Michael C. Mongeon;

U.S. Publication No. US-2006-0222384-A1, published Oct. 5, 2006, entitled "IMAGE ON PAPER REGISTRATION ALIGNMENT," by Steven R. Moore, et al.;

U.S. Publication No. US-2006-0233569-A1, published Oct. 19, 2006, entitled "SYSTEMS AND METHODS FOR REDUCING IMAGE REGISTRATION ERRORS," by Michael R. Furst, et al.;

U.S. Publication No. US-2006-0238778-A1, published Oct. 26, 2006, entitled "PRINTING SYSTEMS," by Michael C. Mongeon, et al.;

U.S. Publication No. US-2006-0244980-A1, filed Apr. 27, 2005, entitled "IMAGE QUALITY ADJUSTMENT METHOD AND SYSTEM," by Robert E. Grace;

U.S. Publication No. US-2006-0066885-A1, filed May 25, 2005, entitled "PRINTING SYSTEM," by David G. Anderson, et al.;

U.S. Publication No. US-2006-0274337-A1, published Dec. 7, 2006, entitled "INTER-SEPARATION DECORRELATOR," by Edul N. Dalal, et al.;

U.S. Publication No. US-2006-0274334-A1, published Dec. 7, 2006, entitled "LOW COST ADJUSTMENT METHOD FOR PRINTING SYSTEMS," by Michael C. Mongeon;

U.S. Publication No. US-2007-0002403-A1, published Jan. 4, 2007, entitled "METHOD AND SYSTEM FOR PROCESSING SCANNED PATCHES FOR USE IN IMAGING DEVICE CALIBRATION," by R. Victor Klassen;

U.S. Publication No. US-2007-0002344-A1, published Jan. 4, 2007, entitled "COLOR CHARACTERIZATION OR CALIBRATION TARGETS WITH NOISE-DEPENDENT PATCH SIZE OR NUMBER," by R. Victor Klassen;

U.S. Publication No. US-2007-0024894-A1, published Feb. 1, 2007, entitled "PRINTING SYSTEM," by Steven R. Moore, et al.;

U.S. Publication No. US-2007-0052991-A1, published Mar. 8, 2007, entitled "METHOD AND SYSTEMS FOR DETERMINING BANDING COMPENSATION PARAMETERS IN PRINTING SYSTEMS," by Goodman, et al.; and U.S. application Ser. No. 11/314,774, filed Dec. 21, 2005, entitled "METHOD AND APPARATUS FOR MULTIPLE PRINTER CALIBRATION USING COMPROMISE AIM," by R. Victor Klassen.

BACKGROUND

While the exemplary embodiment is particularly directed to the art of digital image processing, and will be thus described with specific reference thereto, it will be appreciated that the exemplary embodiment may have usefulness in other fields and applications.

Serial printing architectures (and parallel printing architectures to some extent) enable printing on one page using more than one print engine. For example, a printing system could be used for enhanced color printing. In this regard, highlight colors, gamut extension toners, and clear coats could be printed with a second print engine. See, for example, U.S. Publication No. US-2006-0222378-A1, published Jan. 4, 2007, entitled "PRINTING SYSTEM," by Paul C. Julien. Other printers utilize more than four colorants in their printing processes. Recent developments have aimed at the needs presented by these printing processes by enabling the appearance of conventional rosette halftoning while using more than four colorants.

However, print quality can suffer from misregistration defects in certain serial and parallel printing architectures. For instance, shifted page numbers and tilted text lines can be observed in show-through if front-to-back registration is poor in the second engine. Further, using serial and parallel printing to incorporate additional colorants or image content on a previously printed sheet can result in color halos around printed objects if the image printed by the second engine is not registered with the first printing.

In the area of handling a document by multiple print engines, some systems may lightly fuse the image produced by a first print engine so it will not be distorted by fusing or smeared during handling into a second print engine have been developed. See, for example, U.S. Publication No. US-2007-0071465-A1, Published Mar. 29, 2007, by Hamby et al.

Therefore, what is needed is a method for re-registering these documents before the second print engine. In the "light first-fusing" scenario, the re-registration needs can be considered zero-order and first-order, where only offset and skew must be corrected. If heavier fusing is applied in the first print engine, higher-order re-registration operations, which can be more difficult, are needed to account for more complicated paper distortion.

BRIEF DESCRIPTION

Disclosed herein is a method to re-register a print immediately before entering or just upon entering a later print engine in a serial or parallel printing architecture.

In accordance with an aspect of the exemplary embodiment, a method of registering a print between print stages in a printing system is provided. The method comprises: printing a first part of a digital image on a substrate with a first print engine, wherein the first part of the digital image includes a plurality of reference features; scanning image content on the substrate as it is readied for the second print engine; determining the actual positions of the reference features; using the actual positions of the reference features to determine desired adjustments for the second part of the digital image; applying electronic registration according to the desired adjustments to modify image content of the second print to be aligned with content already on the substrate; and printing a second part of the digital image on the substrate.

In accordance with another aspect of the exemplary embodiment, an image processing method is provided. The image processing method comprises: printing a first part of a digital image on a substrate with a first print engine, wherein the first part of the digital image includes a plurality of reference features; scanning image content on the substrate as it is readied for the second print engine via an image sensing unit; determining the actual positions of the reference features; and using the actual positions of the reference features to determine skew, offset, and distortion of the first part of the digital image.

In accordance with yet another aspect of the exemplary embodiment, an image processing system is provided. The system comprises: a first print engine which prints a first part of a digital image on a substrate, wherein the first part of the digital image includes a plurality of reference features; an electronic registration mechanism which scans image content on the substrate as it is readied for the second print engine via an image sensing unit, determines the actual positions of the reference features, uses the actual positions of the reference features to determine desired adjustments for the second part of the digital image, and applies electronic registration according to the desired adjustments to modify image content of the second print to be aligned with content already on the substrate; and a second print engine which prints a second part of the digital image with aligned image content on the substrate.

DETAILED DESCRIPTION

Aspects of the embodiments disclosed herein relate to a xerographic printing system that facilitates custom color printing as well as printing with primary colors (CMYK). The printing system includes a plurality of print engines, which may be linked by a common network of pathways connecting the print engines with each other and with an output destination. The print engines may all be under the control of a common control system for printing images from a common print job stream. The printing system can have a modular architecture that allows one or more print engines to be interchanged with other print engines. The printing system enables custom color, and process color and/or black and white printing on the same sheet in a single printing system.

The term "print engine" refers to a device for applying an image to print media. Print media generally refers to a usually flimsy physical sheet of paper, plastic, or other suitable physical print media substrate for images, whether precut or web fed.

A "print job" is normally a set of related sheets, usually one or more collated copy sets copied from a set of original document sheets or electronic document page images, from a particular user, or which are otherwise related.

Figure 1:
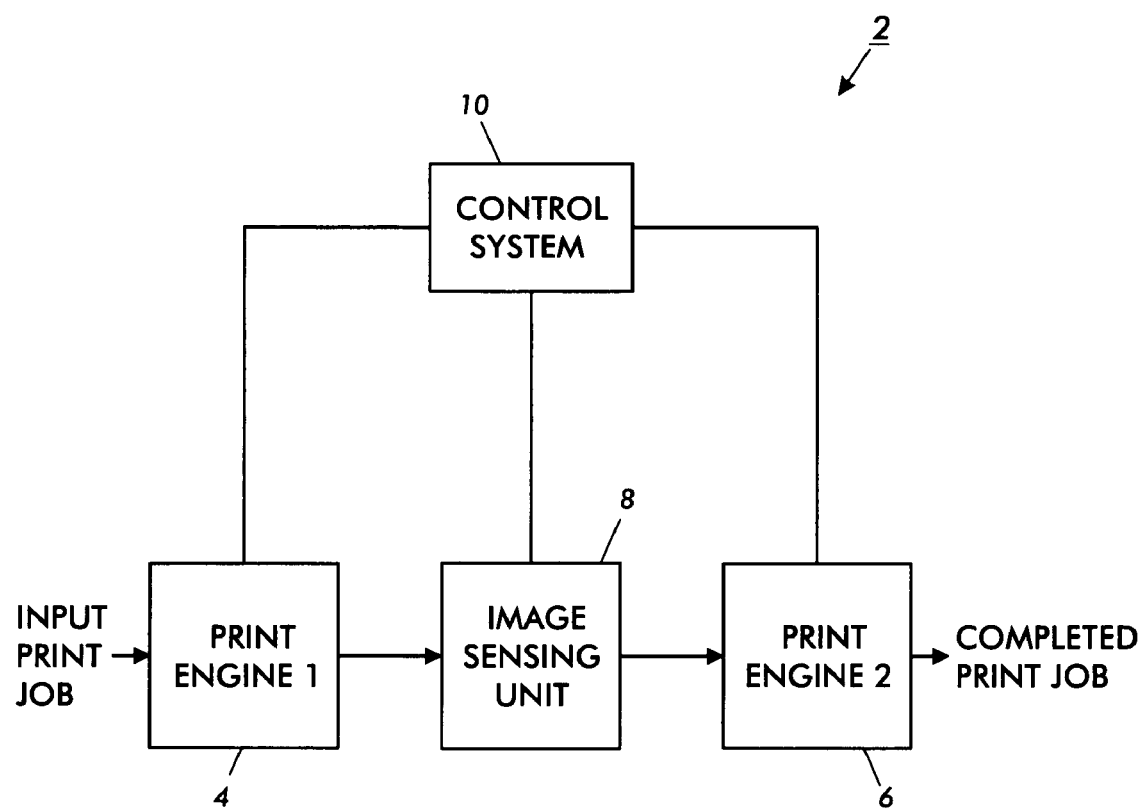
FIG. 1 is a schematic view of a printing system according to aspects of the exemplary embodiment.

Turning now to the drawings, a simple block diagram of a printing system 2 suitable for implementing aspects of the exemplary embodiment is shown in FIG. 1. The printing system 2 includes a first print engine 4, a second print engine 6, an image sensing unit 8, and a control system 10.

The print engines 4, 6 include many of the hardware elements employed in the creation of desired images by electrophotographic processes. While particular reference is made to electrophotographic printers or print engines, suitable print engines may also include ink-jet printers, including solid ink printers, thermal head printers that are used in conjunction with heat sensitive paper, and other devices capable of printing an image on a substrate. It is to be appreciated that each of the print engines can include an input/output interface, memory, a print cartridge platform, a print driver, a function switch, a controller and a self-diagnostic unit, all of which can be interconnected by a data/control bus. Each of the print engines can have a different processing speed capability.

By way of example, the printing system 2 could be used to print jobs using more than four colorants for a variety of purposes such as high fidelity color, reduced texture through low load toners, special effects and security applications. In this regard, the colorants used in the print engines 4, 6 could be in a number of different configurations. The first print engine 4 could be a standard CMYK printer, while the second print engine 6 could contain nonstandard colorants, such as low load toners, hi-fi toners, or specialty colorants. Another option would be to reverse the order to have the nonstandard colorants printed first, which could be advantageous for reasons such as the less-frequently printed nonstandard colors would be handled by two print engines, while the mainline colorants would be handled by only one thus having less likelihood of degradation. Also, the standard colorants and nonstandard colorants do not need to be in separate print engines. Rather, a multiple print engine parallel printing configuration could have any number of imaging/development stations that could be used in any desired configuration. Some colorants may even be placed in more than one print engine. For example, the first print engine 4 may contain CMYK, while the second print engine 6 contains K plus three other colorants. The repeat of K may be desirable to users that print many documents with black text, where there is the potential for quickly depleting K supplies and placing heavy wear on K imaging and development components. Also note that the term "colorant" is used here somewhat loosely because the architecture discussed herein also enables spot varnish applications with clear toners.

Additionally, either one of the print engines may be used for applying print media for magnetic ink character recognition (MICR) and clearcoat printing. MICR printing applies a magnetic pattern or other detectable portion to the page, for example, as a security feature for bank notes. Clear coat printing applies a transparent overcoat to a printed sheet to protect other color layers from abrasion.

Duplex printing is another example of serial printing. In this case, there may be only one engine but two printing stages involved. The print engine 4 and the print engine 6 in FIG. 1 could be interpreted as a printing device used at different printing stages. A front-to-back misregistration may exist in common duplex printing.

In addition, the printing system 2 may incorporate "tandem engine" printers, "parallel printers," "cluster printing," "output merger," or "interposer" systems, and the like, as disclosed, for example, in U.S. Pat. No. 4,579,446 to Fujino; U.S. Pat. No. 4,587,532 to Asano; U.S. Pat. No. 5,489,969 to Soler, et al.; U.S. Pat. No. 5,568,246 to Keller, et al.; U.S. Pat. No. 5,570,172 to Acquaviva; U.S. Pat. No. 5,596,416 to Barry, et al.; U.S. Pat. No. 5,995,721 to Rourke et al; U.S. Pat. No. 6,554,276 to Jackson, et al.; U.S. Pat. No. 6,607,320 to Bobrow, et al., and U.S. Pat. No. 6,654,136 to Shimada, the disclosures of all of these references being incorporated herein by reference. A parallel printing system is one in which two or more printers are configured for contemporaneously printing portions of a single print job and may employ a single paper source which feeds paper from a common paper stream to a plurality of printers or multiple paper sources. The printers may be horizontally and/or vertically stacked. Printed media from the various printers is then taken from the printer to a common output destination. The common output destination can be a finisher, where the sheets associated with a single print job are assembled, or other location which is accessible from all of the printers for receiving printed media. Variable vertical level, rather than horizontal, input and output sheet path interface connections may be employed, as disclosed, for example, in U.S. Pat. No. 5,326,093 to Sollitt.

It should be understood that a sheet registration system in the first print engine 4 may deliver sheets of all kinds to specified positions and angles for subsequent functions within printers, copiers and other printing machines. The subsequent functions may include transferring an image to the sheet, stacking the sheet, slitting the sheet, etc. Conventional registration systems correct for skew, lateral offset, and process errors. "Skew" is the angle the leading edge of a sheet being transferred differs from perpendicular to the desired direction of transfer. "Lateral offset" or "cross process offset: is the lateral misalignment of the sheet being transferred with respect to the desired transfer path. "Process" relates to the timing of the sheet within the printing machine such that the sheet arrives at various destinations at the proper times.

In present day high speed copiers and printers, active registration systems are used to register the sheets accurately. In an active registration system, a sheet is passed over sensor arrays from which the sheet skew, lateral offset, and process errors are calculated. Skew is corrected in some registration systems by rotating drive rollers on opposite ends of a common drive axis at different velocities. Lateral offset may be corrected, for example, by moving the rollers in unison to one side or another. Process errors may be corrected, for example, by driving the rollers faster or slower.

Upon completion of the registration process corrects for skew, lateral offset, and process errors the sheet is aligned along a desired transfer path and ready to receive an image within a pre-defined image area, such as the area defined within 1 inch margins or borders of the sheet. Following the registration process each sheet is delivered to an imaging station where an image is created on the surface of the sheet. In some print engines, the sheet is then passed through a fuser that fuses the image to the sheet. It is typically desirable for the image to be centered within the predefined image area.

Nonetheless, print quality can suffer from misregistration defects in printing architectures such as the printing system 2 described above. For instance, image-to-paper misregistration can result in shifted page numbers and tilted text lines that can be observed in show-through if front-to-back registration is poor in the second print engine 6. Using serial and parallel printing systems to incorporate additional colorants or image content on a previously printed sheet can result in color halos around printed objects if the image printed by the second print engine 6 is not registered after the first printing.

Further, passing a fused print to the second print engine 6 may lead to dehydration of the paper and, consequently, distortion of the paper, among other things. As a result of these effects, image quality and reliability may be negatively impacted for the printing system 2. Distortion of the paper can lead to misalignment of the image portions printed in the two print engines 4, 6, and even with a perfect shift and tilt registration between two engines the resulting artifact due to the misalignment may be still perceptible and objectionable.

Thus, with respect to the handling of images between the print engines 4, 6, an image processing registration operation may be performed on the digital image targeted for a later print engine to ensure that it is well registered with an image printed by a previous print engine. The position of the image printed on the paper in the first print engine 4 can be sensed with an image sensing unit 8. As to the positioning of the image sensing unit 8—there is a first printing step and a second printing step. Generally, the discussion has focused on the image sensing unit 8 as being between two print engines because that situation presents the ability to sense problematic paper distortion due to fusing from the first engine. But, in general there are two printing steps, and it is necessary to sense between those two steps. Using the two-print-engine example, the image sensing unit 8 could be at the back end of the first print engine 4, between the two print engines 4, 6, or at the front end of the second print engine 6. For the two-print-engine application, it is most useful to have it in the second print engine 6 so the image sensing unit 8 can detect the alignment of the paper as it being delivered to the second print stage.

The image sensing unit 8 may comprise any type of electronic sensor including a charge coupled device (CCD) array or a full width array (or imaging bar). A CCD or full width array typically comprises one or more linear arrays of photo-sites, wherein each linear array may be sensitive to one or more colors. In a color image capture device, the linear arrays of photo-sites are used to produce electrical signals which are converted to color image data representing the scanned document. However, in a black-and-white scanner, generally, only one linear array of photo-sites is used to produce the electrical signals that are converted to black and white image data representing the image of the scanned document.

Examples of full width arrays that can be used in the image sensing unit 8 are disclosed in, for example, U.S. Pat. No. 5,031,032 to Perregaux, et al.; U.S. Pat. No. 5,473,513 to Quinn; U.S. Pat. No. 5,545,913 to Quinn et al.; U.S. Pat. No. 5,552,828 to Perregaux; U.S. Pat. No. 5,604,362 to Jedlicka et al.; U.S. Pat. No. 5,691,760 to Hosier et al.; U.S. Pat. No. 5,748,344 to Rees; and U.S. Pat. No. 6,621,576 to Tandon et al., all of which are hereby incorporated by reference in their entirety. Such full width arrays typically come already provided with at least three different color filters, such as red, green and blue, overlying three rows of closely spaced light sensor elements (photo-sites), to provide electrical output signals corresponding to the colors of the document image being scanned. Such imaging bars are typically formed by edge butting together a number of individual imaging chips, each having such multiple tiny and closely spaced photo-sites. Generally, there are three rows of such photo-sites on each such chip, as in the assembled imaging bar, with said integral filters for red, green and blue, respectively.

Having the sensed position of the reference features allows for processing on the digital image in the second print engine 6 to ensure suitable registration with the previously printed image via a control system 10. For example, a few yellow marks placed on the printed page in the first print engine 4 are practically imperceptible and can provide sufficient position and orientation information for the registration operation. An affine transform or shearing could adjust the registration to be within one to two pixels of accuracy. For certain papers or print engines more registration marks and high-order warping may need to be performed to compensate for paper warping.

The control system 10 generally comprises conventional computer components, including a central processing unit (CPU), memory storage devices for the CPU, and connected display devices, for running one or more computer programs. Such computer program(s) may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

Figure 2:
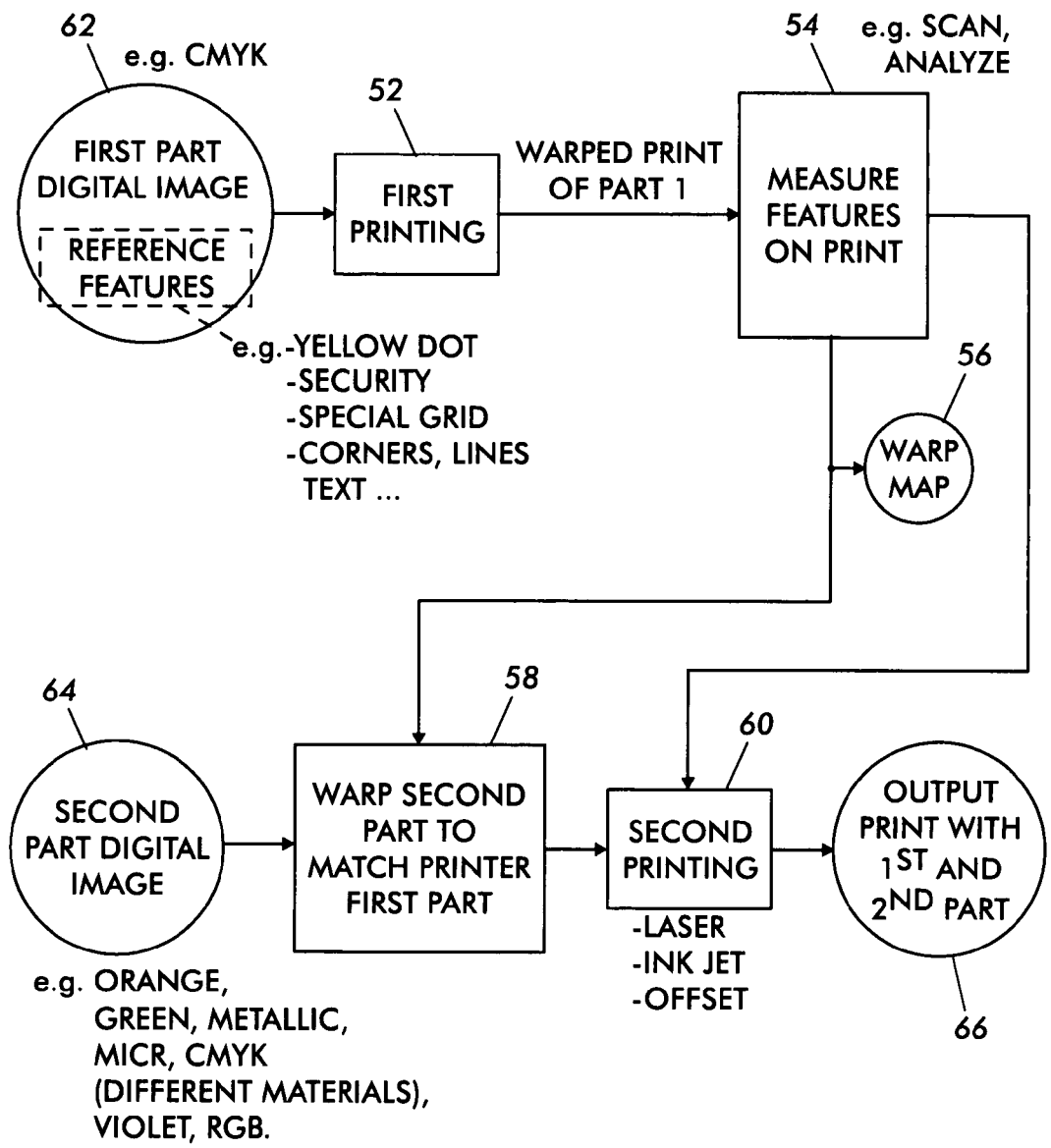
FIG. 2 is a flowchart outlining an exemplary embodiment of a method of re-registering a document using reference features and digital realignment.

Turning now to FIG. 2, a method to re-register a print before utilizing a later print engine in a serial or parallel printing architecture in real-time is illustrated. It should be noted that the term "re-registration" is being used here to indicate that registration operations are taking place in a second printing step. There could be some number of registration operations that occur in the first print engine 4 as described above, and we refer to re-registration and registration operations in a second print engine 6 such that the second engine printing is registered with the first engine printing.

The exemplary method includes: (1) printing the first part of the digital image, along with reference features such as low visibility marks, with the first print engine 4 (52); (2) sensing those reference features with the image sensing unit 8 as the print is readied for the second print engine 6 (54); (3) determining the positions of the reference features and using the positions to determine desired adjustments for the second part of the digital image (56); (4) applying electronic registration according to the desired adjustments (digital warping) to modify image content of the second print to be aligned with content already on the print (56); and (5) printing the second part of the digital image with the second print engine 6 (60).

As stated earlier, a digital image may comprise a first part (62) and a second part (64). Reference features such as low visibility marks may be added during the printing of the first part 62 of the digital image. In general, there are many ways of producing low visibility marks, such as using very few isolated pixels of almost any colorant or using special colorants such as white, clear, UV fluorescent, etc. In particular, the low visibility marks may be yellow dots, such as those used for security purposes or ones specifically designed for re-registration. For instance, small groups of two or three yellow dots could be placed in arrangements that will allow them to be distinguished from background toner.

One example of the use of yellow dots in printing is discussed in U.S. Pat. No. 5,515,451 to Knox, which is incorporated by reference herein. This patent describes an image processing system for selectively reproducing documents. With this process, known color photocopiers are provided with a further countermeasure that prints substantially-latent, photocopier-specific information on each output document that is produced.

For example, copier-specific information, in the form of a repeating yellow dot pattern having areas and/or densities that are below the threshold of visual perception, is printed on every output document generated by the photocopier. The use of yellow toner for the dot pattern is preferred because most people are not able to visually detect yellow as well as they can detect other colors. Photocopier-specific information can include the photocopier manufacturer, photocopier serial number, photocopier model number, etc. This alphanumeric information can be converted to numeric code, and the numeric code can then be represented as a pattern of dots that are repeated across an output document. For example, Xerox Corporation can be assigned a manufacturer's code of $50_{10}$, which can be represented as $00110010_2$. The binary 1's can be represented as yellow dots, and the binary 0's can be represented as spaces.

Figure 3:
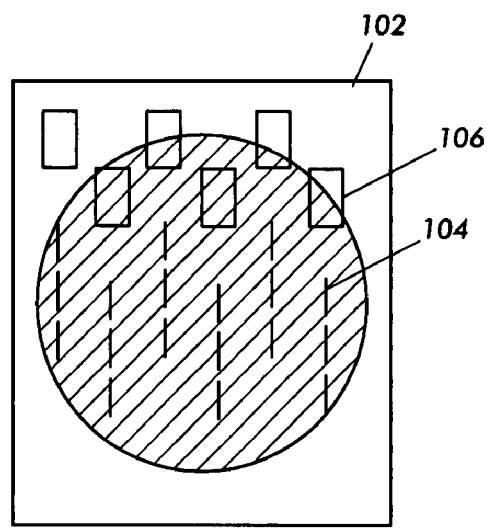
FIG. 3 illustrates a photocopier generated document having a primary image and a repeating pattern of copier-specific information printed therein.
Figure 4:
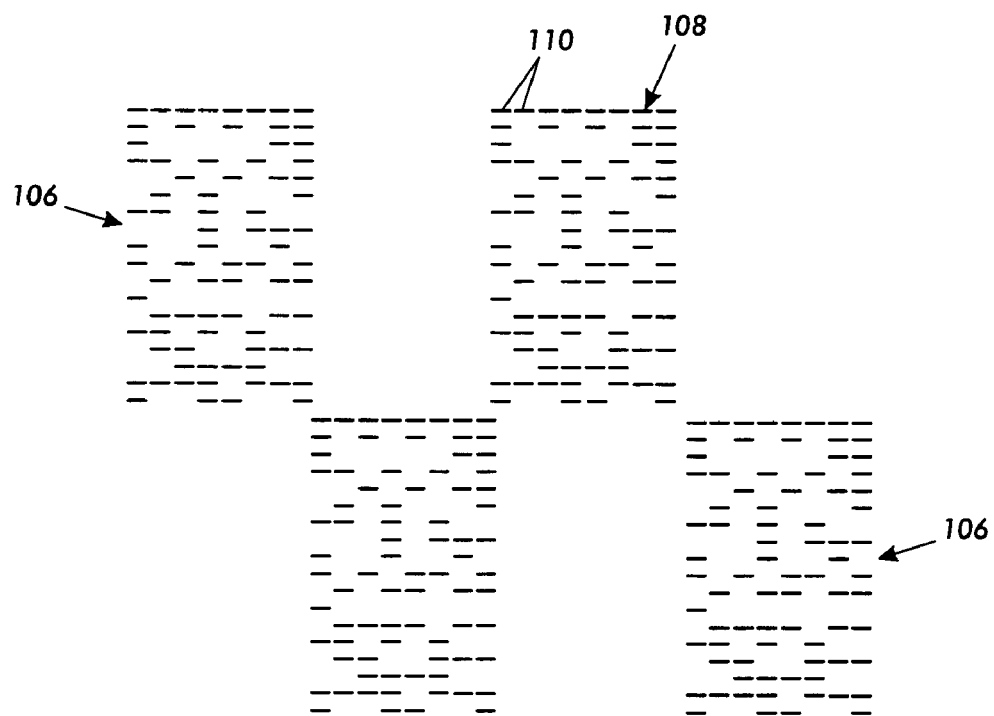
FIG. 4 is an enlarged view of the copier-specific information arranged in a repeating block pattern with one byte of information per row.

By way of example, FIGS. 3 and 4 illustrate an output document 102 upon which a copied image 104 along with latent copier-specific information are printed. The copier-specific information is in the form of repeating blocks of code data 106 that are arrayed across the output document. In this example, one byte of code data forms a single row 108 of the block, and each dot position 110 in the row represents a single bit of a code data byte. The dot pattern for each bit can consist of two yellow pixels in the fast scan direction and one yellow pixel in the slow scan direction. This extremely small yellow dot pattern is below the threshold of visual perception for most people.

Latent copier-specific information can sometimes be detected by viewing the counterfeit document through a blue filter and a magnifier. This maximizes the contrast of the photocopier-signature if the filter is chosen to be the complement of the colored dot pattern. When such a dot pattern is detected, the photocopier-specific information can be decoded and then used by law enforcement agencies to track down counterfeiting perpetrators. However, in the case where the copied image 104 and/or the plain document substrate 102 include a yellow color component, it can be very difficult to detect the yellow dot pattern with conventional methods. That is, this known method of detecting copier-specific information works as long as the background information does not significantly lower the visual contrast of the photocopier signature.

If skew and offset are the only attempted adjustments to be performed, then only a few dots are needed to provide reasonably accurate information for that zero-order and first-order correction. However, more marks must be placed throughout the document if higher-order correction is attempted to account for effects such as paper distortion. Yellow security dots produced on certain machines occur thousands of times within a page and would be more than sufficient to characterize the low frequency distortions that occur in fusing.

The number of marks employed should account for the possibility that some number of marks could be covered by image content that will prevent their detection. Rather than use consistently positioned marks, a more complicated method could vary the locations depending on image content. Those locations, consistent or dynamic, should be made available when position errors are determined.

An additional possibility is measuring the distortion using image features, such as text, graphical objects, edges of pictures, or other spatially distinct image content. This alternative may avoid the necessity of printing additional marks and avoids the potential problem of image content covering the special marks. The image features selected for this purpose can be communicated to the control block, which can compare positions of the features in the scanned image and within the original digital so as to determine any offset, skewed or warped relationship between the two. The selected features can be the objects mentioned above (text, edges of pictures), or they can be specific structures of those features, such as corners of text, centroids of text or graphical objects, skeletal representations, or some measure of position.

The next step is to scan and analyze the reference features as the print is readied for the second print engine 6. The image sensing unit 8 could be placed between the first print engine 4 and the second print engine 6 to sense the low visibility marks prior to printing on the second print engine 6. As noted above, full width arrays are current employed in printers and are generally considered useful in achieving consistent and uniform image quality in color printing. If offset and skew are the distortions of interest, the image sensing unit 8 should be placed sufficiently close to the imaging station in the second print engine 6 so that those distortions do not vary after sensing. If higher-order distortions are to be measured, it may be acceptable to sense the distortions as the paper leaves the first print engine 4. This positioning assumes that those distortions do not vary significantly from that sensed time to the second printing.

The next step is to determine the actual positions of the reference features and use those positions to determine desired shifts for image content that is to be printed. A local search can be performed within the digital image in the areas where the marks are expected. The search uses knowledge of where each mark is expected as it was written in the first step, or where particular image content is expected. The regions for performing the search can be referenced to a page edge determined through the image sensing unit 8. A global search throughout the entire image could be performed, but it would be more time efficient and possibly more memory efficient to perform the local searches described here.

For each mark a difference is taken between its expected position and its determined position. Those differences will indicate the image distortion at their respective locations. They can be considered as samples of the misregistration as it occurs through the page.

Electronic registration may then be applied according to the desired adjustments (digital image warping) to modify image content of the second part 64 of the digital image to be aligned with content already on the print. The second part 64 may comprise orange, green, metallic, MICR, CMYK (different material), violet, RGB, just to name a few.

Electronic registration refers to adjusting the spatial positions on the image substrate that the image structures, such as lines and the halftone dots, will be placed by the print engine to compensate for any physical offsets in the print engine that would otherwise result in misregistration between the color separation layers. That is, rather than physically, i.e., mechanically, ensuring that the color separation layers are precisely aligned, the various offsets between the various color separation layers are measured. The electronic data is then electronically modified to change the spatial locations of the resulting image structures, so that the resulting image structures of each corresponding color separation layer are properly aligned. Being able to move or warp an image structure, such as lines or halftone dots, without causing moiré patterns or noise that detract from the image quality increases the utility of electronic registration. Digital image warping is well known in the art and is commonly used to compensate for geometric and optical distortions. A thorough discussion of digital image warping may be found, for example, in George Wolberg's "*Digital Image Warping*", IEEE Computer Society Press, Los Alamitos, Calif., 1990.

Digital image warping must be applied to the image content that is to be written by the second print engine 6 so that its subject matter occurs in register with image content of the first printing. In general, the mark locations and desired adjustment values provide interpolation nodes and values that can be used in a warping algorithm applied to the second part of the digital image.

There are several possible warping schemes. For instance, the warp can be applied on the binary halftoned image. See U.S. Publication No. US-2003-0175602-A1 by Kazama, and U.S. Publication No. US-2006-0092264-A1, by Matsuzaki et al., each of which is incorporated by reference herein. Or the warp could be applied to the contone image. The most straightforward, and possibly the most practical, is to assume that the problem to be solved is limited to offset and skew. Also, if we assume that the print engines are operating at 2400×2400 spi or 2400×4800 spi, then at sufficiently high resolution the image can be sheared in one or two directions to accomplish these zero-order and first-order warps without introducing significant defects. Techniques such as dithering the location of the shear may be used to avoid defects that can occur through interaction with the halftone. Higher-order distortion would require higher-order warping. While these warping methods are generally known in the field of digital image warping, we may encounter challenges in achieving completely defect-free halftone prints. Also see U.S. Pat. No. 6,816,269 to Loce et al.; U.S. Pat. No. 6,529,643 to Loce et al.; U.S. Pat. No. 5,430,472 to Curry; and U.S. Pat. No. 5,264,943 to Curry, all of which are hereby incorporated by reference in their entirety.

Finally, the second print engine 6 prints the second part of the digital image, whereby the output 66 includes a properly registered print including the first and second parts of the digital image.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of registering a print between print stages in a printing system, the method comprising:
   printing a first part of a digital image on a substrate with a first print engine, wherein the first part of the digital image includes a plurality of reference features that comprise low visibility marks;
   scanning image content on the substrate as it is readied for a second print engine via an image sensing unit;
   determining actual positions of the reference features;
   calculating a difference between an expected position on the digital image and the determined actual positions of the reference features
   to determine desired adjustments for a second part of the digital image;
   applying electronic registration according to the desired adjustments to modify the image content of a second print to be aligned with the image content already on the substrate; and
   after modifying the image content of the digital image, printing the second part of the digital image with aligned image content on the substrate.

2. The method of claim 1, wherein the low visibility marks comprise at least three yellow dots.

3. The method of claim 1, wherein the image sensing unit comprises a full width array.

4. The method of claim 1, wherein the first print engine comprises a xerographic printer.

5. The method of claim 1, wherein the second print engine comprises a xerographic printer.

6. An image processing method comprising:
   printing a first part of a digital image on a substrate with a first print engine of a serial printing system, wherein the first part of the digital image includes a plurality of reference features that comprise low visibility marks;
   scanning image content on the substrate as it is readied for a second print engine of the serial printing system via an image sensing unit;
   determining the actual positions of the reference features; and
   comparing the actual positions of the reference features against expected positions of the digital image to determine skew, offset, and distortion of the first part of the digital image before printing the second part of the digital image with the second print engine.

7. The method of claim 6 further comprising:
   adjusting the substrate to correct for skew or offset; and
   printing a second part of the digital image on the substrate.

8. The method of claim 6, wherein the low visibility marks comprise at least three yellow dots.

9. The method of claim 6, wherein the image sensing unit comprises a full width array.

10. The method of claim 6, wherein the first print engine comprises a xerographic printer.

11. The method of claim 6, wherein the second print engine comprises a xerographic printer.

12. An image processing system comprising:
   a first print engine which prints a first part of a digital image on a substrate, wherein the first part of the digital image includes a plurality of reference features that comprise low visibility marks;
   an electronic registration mechanism which scans image content on the substrate as it is readied for a second print engine via an image sensing unit, the electronic registration mechanism determines the actual positions of the reference features and compares the actual positions of the reference features against expected positions of the reference features of the digital image to determine desired adjustments for a second part of the digital image, and applies electronic registration according to the desired adjustments to modify image content of the second print to be aligned with content already on the substrate; and
   the second print engine which prints the second part of the digital image with aligned image content on the substrate.

13. The system of claim 12, wherein the low visibility marks comprise at least three yellow dots.

14. The system of claim 12, wherein the image sensing unit comprises a full width array.

15. The system of claim 12, wherein the first print engine comprises a xerographic printer.

16. The system of claim 12, wherein the second print engine comprises a xerographic printer.

* * * * *